(No Model.)

C. T. SNEDEKOR.
ELECTRIC CONDUCTOR.

No. 463,079. Patented Nov. 10, 1891.

WITNESSES:
J. J. Laass
C. L. Bendixon

INVENTOR:
Charles T. Snedekor
By Duell, Laass & Duell
his ATTORNEYS.

UNITED STATES PATENT OFFICE.

CHARLES T. SNEDEKOR, OF NEW YORK, N. Y.

ELECTRIC CONDUCTOR.

SPECIFICATION forming part of Letters Patent No. 463,079, dated November 10, 1891.

Application filed May 8, 1891. Serial No. 392,051. (No model.)

*To all whom it may concern:*

Be it known that I, CHARLES T. SNEDEKOR, of New York city, in the county of New York, in the State of New York, have invented new and useful Improvements in Insulation for Electric Wires, of which the following, taken in connection with the accompanying drawings, is a full, clear, and exact description.

My invention relates to insulation for electric wires, and the object is to make ordinary rubber-covered wire fire-proof. It is preferable in many cases to cover wires with rubber, as it is a good electric insulator; but, as it also ignites very easily, it is dangerous and destructive to property.

I am aware that wires have heretofore been covered with refractory or fire-proof material, but not wires that are first covered with rubber. It being necessary to employ rubber for the first covering of the wire to make a positive water-proof insulation, it is desirable to make this rubber covering fire-proof.

By my method less rubber is required for covering the wire, for the reason that the other substances applied supply the protection desired. The cost, therefore, of my insulated wire will be about the same as the ordinary rubber-covered wire, although it is also fire-proof.

To this end my invention consists in first covering the wire with rubber and then covering the rubber with a suitable refractory material.

My invention consists, also, in first applying an adhesive substance to the rubber covering, then applying a powdered refractory material to the adhesive substance, covering the refractory material with tape or braid saturated with silicate of soda, then applying a compound containing a refractory material, covering the compound with a braided fiber, and, finally, coating the insulation with asphalt or other water-proof material; and my invention consists in certain other combinations hereinafter described, and specifically set forth in the claims.

Figure 1:
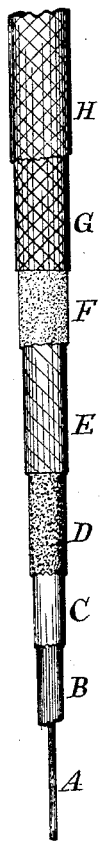
Figure 2:
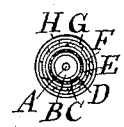

Referring to the drawings, Figure 1 is a side view of a wire insulated according to my invention, and with the insulation removed to show the different materials used clearly; and Fig. 2 is a cross-section of the wire.

In the drawings, A is the wire, which may be of any metal, size, or shape.

B is the rubber covering, as ordinarily employed for insulating wires.

C is a coating of some adhesive material, as glue or a gum of some kind, which may be applied in any desired manner.

D is granulated or powdered mica or asbestus or other suitable substance, which is preferably applied to the adhesive coating before it becomes hardened, but may be, if desired, combined or mixed with the said adhesive substance and applied with it. Silicate of soda or potash may also be added or combined with the mica or asbestus when it is applied after the application of the adhesive substance.

E is a tape or braid of cotton or other desired fiber, which is preferably saturated with a silicate, as a silicate of soda or potash.

F is a covering of pulverized mica and white lead, that may be applied over the tape.

G is a second tape or braid woven over this to hold the whole intact, and H is a finish of any desired material, preferably one that has non-combustible properties and will resist the penetration of water or is what is commonly termed "water-proof." The latter material may be made partly of asphalt or shellac.

I do not limit myself to the use of pure rubber for the insulation of the wire, as no rubber on the market is strictly pure, and, furthermore, various substances may be mixed with the rubber intentionally for different reasons. Therefore by the term "rubber," used in the claims, I mean rubber or any composition containing rubber or gutta-percha.

Having described my invention, what I claim as new, and desire to secure by Letters Patent, is—

1. An insulating covering for electric conductors, consisting of a rubber covering, an adhesive substance upon the rubber covering, a powdered refractory material over the adhesive substance, tape saturated with a silicate, and a suitable finish over the tape or braid.

2. An insulating covering for electric conductors, consisting of a covering of rubber upon the wire, an adhesive substance upon the rubber covering, a powdered refractory material, tape saturated with a silicate over the refractory material, a suitable refractory compound, and a suitable finish covering the whole.

3. An insulating covering for electric conductors, consisting of a covering of rubber, an adhesive substance upon the rubber covering, a powdered refractory material, tape saturated with a silicate, a coating of mica and white lead, and a suitable finish over the whole.

4. An insulating covering for electric conductors, consisting of a covering of rubber, an adhesive substance upon the rubber covering, a powdered refractory material held by the adhesive substance, tape saturated with a silicate over the refractory material, a suitable refractory compound covering the tape or braid, a covering of braid over the compound, and a suitable finish over all.

5. An insulating covering for electric conductors, consisting of a covering of rubber, an adhesive substance upon the rubber covering, a powdered refractory material, tape saturated with a silicate, a suitable refractory compound, a covering of braid over the compound, and a coating of suitable waterproofing material over the braid.

6. An insulating covering for electric conductors, consisting of a covering of rubber, an adhesive substance upon the rubber covering, a powdered refractory material, tape saturated with a silicate, a suitable refractory compound, braid covering the said compound, and a coating over the braid of a non-combustible material.

7. An insulating covering for electric conductors, consisting of a covering of rubber, an adhesive substance over the rubber covering, a powdered refractory material held by said adhesive substance, tape saturated with a silicate over the refractory material, a suitable refractory compound upon the braid, braid over the said compound, and a coating of suitable non-combustible and water-proof material upon the braid.

8. An insulating covering for electric conductors, consisting of a rubber covering upon the wire, an adhesive substance upon the rubber covering, a powdered refractory material in and upon the adhesive substance, a covering of tape saturated with silicate of soda over said refractory material, a compound containing a refractory material upon the tape or braid, a braided fiber covering the compound, and a coating of asphalt or other water-proof material over all.

In testimony whereof I have hereunto signed my name this 23d day of April, 1891.

CHARLES T. SNEDEKOR. [L. S.]

Witnesses:
R. P. SKELTON,
A. E. KIERN.